United States Patent [19]

Matsuda et al.

[11] Patent Number: 5,011,539

[45] Date of Patent: Apr. 30, 1991

[54] DESCALING OF JACKET OF GLASS-LINED INSTRUMENTS

[75] Inventors: Teruo Matsuda, Chiba; Masayoshi Miki; Hiromu Ochi, both of Ehime, all of Japan

[73] Assignee: Sumitomo Chemical Company, Limited, Osaka, Japan

[21] Appl. No.: 338,000

[22] Filed: Apr. 14, 1989

[30] Foreign Application Priority Data

Dec. 2, 1988 [JP] Japan ............................. 62-306664
Feb. 2, 1989 [JP] Japan ............................. 1-25292

[51] Int. Cl.$^5$ ........................... C23F 1/44; C23F 1/00
[52] U.S. Cl. ........................... 134/22.14; 134/22.11; 134/41; 134/3; 252/81; 252/146; 252/147; 252/148
[58] Field of Search .............. 134/3, 22.14, 41, 22.11; 252/146, 147, 148; 252/81

[56] References Cited

U.S. PATENT DOCUMENTS

| | | | |
|---|---|---|---|
| 3,049,496 | 8/1962 | Monroe | 252/146 |
| 3,401,120 | 9/1968 | Chiddix | 252/146 |
| 3,404,094 | 10/1968 | Keeney | 252/148 |
| 3,440,170 | 4/1969 | de Hek | 252/147 |
| 3,458,354 | 7/1969 | Reich | 134/3 |
| 3,686,123 | 8/1972 | Hiroshi | 252/87 |

FOREIGN PATENT DOCUMENTS

| | | |
|---|---|---|
| 0306268 | 3/1989 | European Pat. Off. . |
| 1546213 | 2/1970 | Fed. Rep. of Germany . |

OTHER PUBLICATIONS

"Boosting Capacities with Chemicals", Charles M. Loucks, Chemical Engineering, Deskbook issue, Feb. 26, 1973, pp. 79 to 84.

"Chemistry Tackles Plant Maintenance", Charles M. Loucks, Chemical Engineering, Mar. 5, 1962, pp. 103 to 120.

Chemical Abstracts, vol. 70, No. 24, Jun. 16, 1969, "Use of Corrosion Inhibitors in Pickling Baths to Lower Amount of Hydrogen Formed."

Shinko Phaudler Catalogue, No. 702, with partial translation.

*Primary Examiner*—Olik Chaudhuri
*Assistant Examiner*—Ourmazd S. Ojan
*Attorney, Agent, or Firm*—Sughrue, Mion, Zinn, Macpeak & Seas

[57] ABSTRACT

A method for descaling the inside of a jacket of a glass-lined instrument by using a cleaning solution containing a detergent and an inhibitor is disclosed, wherein the amount of hydrogen permeated through the matrix of the instrument to the lining glass side is estimated by measuring a rate of hydrogen permeation through the jacket material or a test piece fitted to the circulation line of the cleaning solution and inserting the measured value into a previously established relationship between thickness of a steel plate and a rate of hydrogen permeation, and the concentrations of the detergent and the inhibitor in the cleaning solution, the descaling temperature or the descaling time is controlled so that the rate of hydrogen permeation through the matrix may not exceed 30 ml per m$^2$ of the matrix during the descaling. A relatively large amount of scales can be rapidly and easily removed without causing breaking of the lining glass due to hydrogen permeation while minimizing corrosion of the matrix.

11 Claims, No Drawings

DESCALING OF JACKET OF GLASS-LINED INSTRUMENTS

FIELD OF THE INVENTION

This invention relates to a method for descaling the inside of a jacket of glass-lined instruments. More particularly, it relates to a method for removing iron oxide-based scales generated inside the jacket by dissolving with a cleaning solution without causing breaking of the lining glass due to hydrogen permeation

BACKGROUND OF THE INVENTION

Glass-lined instruments are used with a heating medium, such as steam, water, and other heat conductive fluids, passing through their jacket. During long-term use of such a jacket, however, scales based on iron oxides, e.g., $Fe_3O_4$ and $Fe_2O_3$, generate due to corrosion and adhere to the inside of the jacket. Predominant in the use at relatively low temperatures is $Fe_2O_3$, while $Fe_3O_4$ is more frequently observed in high temperature use. The scale reduces heat conductivity, leading to not only a considerable decrease in productivity but an increase of steam or cooling water in amount required. Periodical descaling of the inside of the jacket is thus desirable.

Known methods for descaling the inside of the jacket of glass-lined instruments include physical methods using high-pressure water and chemical methods by dissolution removal using organic acids or chelating compounds as a detergent.

In the case of using chemical detergents, such as hydrochloric acid, for descaling the inside of the jacket of glass-lined instruments, hydrogen is evolved by reaction between the acid and metals (e.g., steel) and passes through the inner lattice of the metal structure of the steel matrix, reaching the boundary of the lining glass and the steel plate, where it stays and gradually increases the pressure to finally attain a force large enough to break the lining glass, that is, so-called acid impact. The inventors previously developed a method of descaling in which a hydrochloric acid solution containing an inhibitor is used as a cleaning solution to avoid acid impact as disclosed in U.S. patent application Ser. No. 07/237,209 and European Patent Application No. 88308019.4.

In the case of physical descaling methods, such as washing with high-pressure water, since an area subject to washing from the open end is limited, it is necessary to drill the jacket to make several cleaning holes, and such holes should be repaired after washing, thus involving much time and cost. In addition, these methods hardly accomplish complete descaling and are less effective as compared with chemical methods.

The methods of using organic acids or chelating agents as a detergent, though applicable to scales in their early stages, produce only small effects when practically applied to iron oxide-based scale deposits, or require large quantities of expensive detergents.

Returning to the aforesaid method of using a hydrochloric acid solution containing an inhibitor as discovered by the present inventors, it is a fairly good method exhibiting high detergency without causing acid impact. According to this method, however, if the amount of hydrogen permeated increases due to misscontrol of the concentrations of the detergents, e.g., the inhibitor or hydrochloric acid, to induce acid impact, the difficulty in repairing the lining glass and the loss of opportunity would be extremely great so that a fear as to acid impact is still entertained. It is therefore desired to monitor the hydrogen permeation, but it is impossible to directly measure the amount of hydrogen permeated through the matrix.

SUMMARY OF THE INVENTION

In the light of the above-described circumstances, the inventors extensively investigated a method for descaling the inside of a jacket of a glass-lined instrument by use of a cleaning solution while monitoring the rate of hydrogen permeation through the matrix to the glass lining side so that an increase of the hydrogen permeation may be properly coped with.

The present invention relates to a method for descaling the inside of a jacket of a glass-lined instrument by using a cleaning solution containing a detergent and an inhibitor, wherein the amount of hydrogen permeated through the matrix of the instrument to the lining glass side is estimated by measuring a rate of hydrogen permeation through the jacket material or a test piece fitted to the circulation line of the cleaning solution and inserting the measured value into a previously established relationship between thickness of a steel plate and a rate of hydrogen permeation, and the concentrations of the detergent and the inhibitor in the cleaning solution, the descaling temperature or the descaling time is controlled so that the rate of hydrogen permeation through the matrix may not exceed 30 ml per $m^2$ of the matrix during the descaling.

DETAILED DESCRIPTION OF THE INVENTION

Implicit in the glass-lined instruments referred to in the present invention are glass-lined and jacketed reaction vessels, polymerization vessels, and conduits.

The cleaning solution which can be used for descaling according to the present invention includes an aqueous solution of an inorganic acid, an organic acid, or a chelating agent. The inorganic acid includes hydrochloric acid, sulfuric acid, phosphoric acid, and sulfamic acid. From the viewpoint of detergency, hydrochloric acid is chiefly employed. The organic acid includes citric acid, hydroxyacetic acid, and formic acid, and the chelating agent includes sodium ethylenediaminetetraacetate.

These detergents are usually employed as an aqueous solution containing, as assistants, corrosion inhibitors, reducing agents, etc.

The following description concerns the case of using hydrochloric acid as a detergent, taken as an example for detailed illustration. In case of using organic acids or chelating agents, descaling can be achieved by using known descaling conditions, such as the concentration of the detergent and the temperature, in the same manner as for the case of using hydrochloric acid.

The hydrochloric acid aqueous solution used as a cleaning solution contains at least one inhibitor selected from the group consisting of laurylamine, lauryldimethylamine, and propargyl alcohol, with or without stannous chloride. Preferred is a hydrochloric acid aqueous solution containing laurylamine, propargyl alcohol, and stannous chloride because it is the lowest in both corrosion rate of the matrix and rate of hydrogen permeation and is high in dissolution rate of scale.

Laurylamine and lauryldimethylamine (hereinafter inclusively referred to as laurylamines) in the form of inorganic salts, e.g., hydrochloride, are readily dissolved in hydrochloric acid. Since free laurylamines, on the other hand, are not easily dissolved, they are preferably dissolved once in a surface active agent, e.g., diethylene glycol, beforehand and then mixed with hydrochloric acid.

The inhibitor, e.g., laurylamines, is added to the hydrochloric acid aqueous solution in concentrations of from about 50 to 1000 wt ppm, preferably from 100 to 500 wt ppm. If the concentration is lower than about 50 wt ppm, the corrosion rate of the matrix and the rate of hydrogen permeation through the matrix both increase. Concentrations exceeding about 1000 wt ppm not only bring no further effects but require a large amount of the surface active agent for dissolving laurylamines. In addition, laurylamines in such high concentrations would undergo precipitation.

The inhibitor selected from laurylamines and propargyl alcohol may be added either as a single compound or as a composition containing these components.

Without the aid of stannous chloride, descaling of the inside of the jacket may be achieved while inhibiting corrosion of the matrix and avoiding acid impact. Addition of stannous chloride further ensures inhibition of corrosion of the matrix and promotes dissolution of the scale.

The stannous chloride is usually added to the hydrochloric acid aqueous solution in concentrations of from about 0.1 to 5%, preferably from 0.5 to 3%, by weight. Addition of less than about 0.1% produces small effects, while concentrations exceeding about 5% bring no further improvements as expected.

The concentration of hydrochloric acid is appropriately selected from the range of from about 5 to 15% by weight depending on the degree of scale deposition. The dissolution rate of the scale is approximately proportional to the concentration of hydrochloric acid. The dissolution rate is too low with the concentration being lower than about 5%. Concentrations exceeding about 15%, though raising no problem in descaling, accompany severe fuming of hydrochloric acid thereby requiring some countermeasure.

Sulfuric acid is undesirable as a detergent in place of hydrochloric acid because of lesser detergency. Nitric acid is also undesirable since it causes appreciable corrosion of the matrix. The cleaning solution comprising a hydrochloric acid aqueous solution and the aforesaid inhibitor may further contain other mineral acids such as sulfuric acid and phosphoric acid or known corrosion inhibitors commonly employed for descaling.

The dissolution rate is also approximately proportional to the temperature of descaling. The descaling temperature is not particularly restricted and is determined taking the amount of the scale and the hydrochloric acid concentration into consideration. It is usually set at about 40° to 65° C. The dissolution rate decreases at temperatures lower than about 40° C., whereas corrosion of the matrix is promoted at temperatures higher than about 65° C.

The descaling time is decided with the above-described conditions being met while taking into consideration the state of scale deposition, an acceptable downtime of the glass-lined instruments, and the like. Normally, the scale can be removed substantially completely by descaling for a period of from about 3 to 5 hours.

No breakage of lining glass occurs with the above-described descaling conditions being met. Nevertheless, there still remains a fear as to acid impact if descaling proceeds under conditions bringing high hydrogen permeation due to errors in preparation of the cleaning solution or disorders of measurement equipment. Such unpredictable breakage of lining glass can be avoided by monitoring the hydrogen permeation.

The state-of-the-art techniques have not realized direct measurement of hydrogen amount permeating through the matrix to the lining glass side. According to the present invention, the rate of hydrogen permeation through the matrix to the lining glass side can be obtained by measuring a rate of hydrogen permeation through the jacket material or a test piece fitted to the circulation line of the hydrochloric acid aqueous solution and inserting the measured value into a relationship between thickness of a steel plate and rate of hydrogen permeation which has been previously prepared. In the case of using a test piece for measuring the rate of hydrogen permeation, it is usually fitted in a measurement box for measuring the temperature, concentration, etc. of the hydrochloric acid solution which is provided in the circulation line of the hydrochloric acid solution The material of the test piece is generally the same as that of the matrix because the rate of hydrogen permeation more or less varies depending on the material.

The rate of hydrogen permeation can be measured in accordance with known methods, such as a glycerine substitution method or an electrochemical method as described in *Boshoku Gijutsu*, Vol. 26, pp. 503–508 (1977).

The rate of hydrogen permeation through the matrix to the lining glass side can be estimated from the amount of hydrogen having permeated through the jacket material or the test piece according to the following equation obtained from the results of measurement of the rate of hydrogen permeation through a steel plate having a varied thickness:

$$H = H_0 \times \left[\frac{T_0}{T}\right]^x$$

wherein H is a rate of hydrogen permeation (ml/m$^2$·hr) through the matrix; T is a thickness (mm) of the matrix; $H_0$ is a rate of hydrogen permeation (ml/m$^2$·hr) through the jacket material or test piece; $T_0$ is a thickness (mm) of the jacket material or test piece; and x is a coefficient of from 1 to 2.5 varying depending on the thickness of a steel plate.

That is, the rate of hydrogen permeation H can be calculated from the thicknesses of the matrix T, the thickness of the jacket material or test piece $T_0$, and the rate of hydrogen permeation through the jacket or test piece $H_0$. In usual cases where the matrix has a thickness between about 10 and 20 mm, and the test piece has a thickness between about 1 and 2 mm, the coefficient x is about 2, giving equation:

$$H = H_0 \times \left[\frac{T_0}{T}\right]^2$$

As countermeasures to be taken in the case when the rate of hydrogen permeation thus calculated is noticeably high, the temperature or concentration of the hydrochloric acid solution is lowered or the concentration of the inhibitor is elevated, taking the abovespecified conditions into consideration.

While the degree of damage of the lining glass due to hydrogen permeation more or less varies depending on the condition of lining, and the like, the glass is generally liable to suffer damages such as acid shock if the amount of hydrogen permeated amounts to 30 to 40 ml per $m^2$ of the matrix. It is hence preferable to control the descaling system so that the rate of hydrogen permeation may not exceed 30 ml per $m^2$ of the matrix, preferably not to exceed 10 ml per $m^2$ for ensuring safety. When the rate of hydrogen permeation per unit time suddenly increases or when the rate of hydrogen permeation is markedly high with a probability to exceed 30 ml per $m^2$ of the matrix, the descaling operation should be stopped even if the scale has not yet been removed sufficiently.

After completion of the descaling of the inside of the jacket, the jacket is drained of the cleaning solution, washed with water, treated with an alkali for neutralization, and again washed with water for use for, e.g., reactions.

According to the descaling method of this invention, a relatively large quantity of jacket scales can be rapidly and easily removed without causing damages of lining glass such as peeling due to hydrogen permeation (i.e., acid impact) while minimizing corrosion of the matrix.

The present invention is now illustrated in greater detail by way of the following Reference Examples and Examples, but it should be understood that the present invention is not deemed to be limited thereto. In these examples, all the percents are by weight unless otherwise specified.

REFERENCE EXAMPLE 1

Detergency of a hydrochloric acid aqueous solution, i.e., capability of dissolving iron oxides ($Fe_3O_4$ and $Fe_2O_3$) which are main components of jacket scales and a scale sample collected from the inside of a jacket of a glass-lined reaction vessel was evaluated as follows.

A flask was charged 50 ml of a 10% aqueous solution of hydrochloric acid and kept at 60° C. Two grams of $Fe_3O_4$, $Fe_2O_3$ or the scale sample were added thereto and stirred. The liquid samples were collected at given time intervals and analyzed for the Fe ion concentration. The results obtained are shown in Table 1. It was revealed that $Fe_2O_3$ was less soluble in the hydrochloric acid aqueous solution.

TABLE 1

| Time (hr) | $Fe_3O_4$ Fe Concentration (%) | $Fe_3O_4$ Dissolution Rate (%) | $Fe_2O_3$ Fe Concentration (%) | $Fe_2O_3$ Dissolution Rate (%) | Sample Scale Fe Concentration (%) | Sample Scale Dissolution Rate (%) |
|---|---|---|---|---|---|---|
| 0.5 | 1.5 | 52 | 0.6 | 21 | 0.6 | 24 |
| 2.0 | 2.6 | 90 | 1.4 | 50 | 1.4 | 56 |
| 4.0 | 2.9 | 100 | 1.7 | 61 | 1.8 | 72 |

REFERENCE EXAMPLE 2

Influences of temperature and hydrochloric acid concentration on solubility of $Fe_2O_3$, which was proved less soluble by the test of Reference Example 1, were investigated by repeating the same procedure of Reference Example 1, except for changing the temperature or concentration of hydrochloric acid (the amount of $Fe_2O_3$ was decreased to 1 g in the test under varied hydrochloric aid concentration). The results obtained are shown in Tables 2 and 3.

TABLE 2

| | 40° C. | | 50° C. | | 60° C. | |
|---|---|---|---|---|---|---|
| Time (hr) | Fe Concentration (%) | Dissolution Rate (%) | Fe Concentration (%) | Dissolution Rate (%) | Fe Concentration (%) | Dissolution Rate (%) |
| 1.0 | 0.2 | 7 | 0.5 | 21 | 1.0 | 34 |
| 2.0 | 0.4 | 14 | 0.9 | 30 | 1.4 | 48 |
| 4.0 | 0.8 | 28 | 1.5 | 51 | 2.0 | 69 |

TABLE 3

| | HCl: 2.5% | | HCl: 5% | | HCl: 10% | |
|---|---|---|---|---|---|---|
| Time (hr) | Fe Concentration (%) | Dissolution Rate (%) | Fe Concentration (%) | Dissolution Rate (%) | Fe Concentration (%) | Dissolution Rate (%) |
| 1.0 | 0.12 | 9 | 0.25 | 18 | 0.62 | 44 |
| 2.0 | 0.17 | 12 | 0.39 | 28 | 0.80 | 57 |
| 4.0 | 0.23 | 16 | 0.58 | 41 | 1.02 | 73 |

REFERENCE EXAMPLE 3

Rate of hydrogen permeation and peeling of lining glass were separately examined since their relationship cannot be directly established.

One side of a soft steel plate having a varied thickness was brought into contact with a 10% hydrochloric acid aqueous solution at 60° C. with the contact area of 7.07 $cm^2$. The amount of hydrogen which was generated due to corrosion of the steel plate and reached the other side of the steel plate through permeation was measured in accordance with a glycerin substitution method [*Boshoku Gijutsu*, Vol. 26, p. 504 (1977)]. The rate of hydrogen permeation was determined from the measured values obtained after 3 and 6 hours from the contacting. The results obtained are shown in Table 4.

Then, a glass-lined steel plate (100×100 mm) composed of a 3 mm or 8 mm thick steel plate and a 1.5 mm thick glass lining was tested in the same manner as described above (HCl concentration: 10%; contact area: 7.07 $cm^2$), and the time elapsed until peeling of the lining glass due to hydrogen permeation occurred was measured. The results are shown in Table 5.

TABLE 4

| | Soft Steel Plate Thickness (mm) | | | | |
|---|---|---|---|---|---|
| | 1 | 2 | 3 | 4 | 8 |
| Rate of Hydrogen Permeation (ml/$m^2$ · hr) | 244 | 42 | 15 | 7 | 3 |

TABLE 5

| | Glass-Lined Steel Plate | | Time Elapsed |
|---|---|---|---|
| Run No. | Steel Plate Thickness (mm) | Glass Lining Thickness (mm) | Before Glass Peeling (hr) |
| 1 | 3 | 1.5 | 4 to 5 |
| 2 | 8 | 1.5 | 12 to 15 |

Although an exact relationship between hydrogen permeation and peeling of lining glass cannot be obtained from the results of Tables 4 and 5 since, strictly considered, the rate of hydrogen permeation through the glass-lined steel plate would differ from that through the steel plate having no lining, it seems that peeling of glass takes place when about 30 to 40 ml of hydrogen per m² of the lined surface stays between the steel plate and the glass lining.

REFERENCE EXAMPLE 4

The rate of hydrogen permeation was determined in the same manner as in Reference Example 3, except for using a 1 mm thick soft steel plate and a cleaning solution comprising a 10% hydrochloric acid aqueous solution and each of the additives shown in Table 6. Simultaneously, the Fe concentration in the solution was measured to obtain a corrosion rate. The results obtained are shown in Table 6.

TABLE 6

| Run No. | Additive Kind | Concentration (ppm) | Diethylene Glycol (wt %) | Corrosion Rate (g/m² · hr) | Rate of Hydrogen Permeation (ml/m² · hr) |
|---|---|---|---|---|---|
| 1 | laurylamine | 100 | 0.5 | 5.9 | 2.2 |
| 2 | lauryldimethylamine | 100 | 0.5 | 30.9 | 11.9 |
| 3 | propargyl alcohol | 200 | — | 5.2 | 2.5 |
| 4 | butylamine | 100 | 1.0 | 242 | 193 |
| 5 | hexylamine | 100 | 1.0 | 228 | 189 |
| 6 | octylamine | 100 | 1.0 | 218 | 180 |
| 7 | decylamine | 200 | 1.0 | 203 | 181 |
| 8 | hexamethylenediamine | 200 | 2.0 | 186 | 172 |
| 9 | hexamethylenetetramine | 200 | 2.0 | 39.3 | 32 |
| 10 | benzyl chloride | 200 | 2.0 | 218 | 178 |
| 11 | dichloroethane | 200 | — | 232 | 188 |
| 12 | — | — | — | 351 | 252 |

REFERENCE EXAMPLE 5

The same test as in Reference Example 4 were carried out, with the exception that the additives were changed in amounts or were used as mixtures thereof. The results obtained are shown in Table 7.

TABLE 7

| Run No. | Additive Kind | Concentration (ppm) | Diethylene Glycol (wt %) | Corrosion Rate (g/m² · hr) | Rate of Hydrogen Permeation (ml/m² · hr) |
|---|---|---|---|---|---|
| 1 | laurylamine | 50 | 0.25 | 39.9 | 12.7 |
| 2 | laurylamine | 200 | 1.0 | 3.2 | 2.3 |
| 3 | laurylamine | 400 | 2.0 | 3.3 | 2.5 |
| 4 | lauryldimethylamine | 50 | 0.25 | 51.6 | 16.3 |
| 5 | lauryldimethylamine | 200 | 1.0 | 19.6 | 5.8 |
| 6 | lauryldimethylamine | 400 | 2.0 | 9.5 | 3.2 |
| 7 | laurylamine | 50 | 0.75 | 9.6 | 3.9 |
|   | lauryldimethylamine | 100 |   |   |   |
| 8 | laurylamine | 50 | 1.0 | 3.2 | 2.3 |
|   | propargyl alcohol | 100 |   |   |   |
| 9 | laurylamine | 100 | 1.0 | 1.9 | 1.5 |
|   | propargyl alcohol | 50 |   |   |   |
| 10 | laurylamine | 100 | 1.0 | 1.2 | 1.1 |
|   | propargyl alcohol | 100 |   |   |   |

REFERENCE EXAMPLE 6

A test piece of a glass-lined steel plate composed of a 3 mm thick steel plate and a 1.5 mm thick glass lining was brought into contact with each of the cleaning solutions shown in Table 7 at 60° C. on its steel side. As a result, no peeling of the lining glass was observed after 100 hours except for Run Nos. 1 and 4.

REFERENCE EXAMPLE 7

In order to examine the effect of stannous chloride on dissolution of a scale sample collected from the inside of a jacket of a glass-lined polymerization vessel, tests were carried out in the same manner as in Reference Example 1, except for using a cleaning solution comprising a 10% hydrochloric acid aqueous solution containing 200 ppm of propargyl alcohol and 100 ppm of laurylamine (with 900 ppm of diethylene glycol) with or without stannous chloride. The results obtained are shown in Table 8.

TABLE 8

| Time (hr) | Fe Concentration (%) | |
|---|---|---|
|   | SnCl$_2$: 0.5% | SnCl$_2$: 0.0% |
| 1 | 1.11 | 0.89 |
| 2 | 1.50 | 1.19 |
| 3 | 1.90 | 1.24 |
| 4 | 1.95 | 1.30 |

REFERENCE EXAMPLE 8

The influences of stannous chloride on corrosion rate of the matrix and rate of hydrogen permeation were examined as follows.

Tests were carried out in the same manner as in Reference Example 4, except for using a 1.5 mm thick soft steel plate and a cleaning solution comprising a 10% hydrochloric acid aqueous solution containing 200 ppm of propargyl alcohol and 100 ppm of laurylamine (with 900 ppm of diethylene glycol) with or without stannous chloride. The results obtained are shown in Table 9.

TABLE 9

| SnCl$_2$ Concentration (%) | Corrosion Rate (g/m² · hr) | | Rate of Hydrogen Permeation (ml/m² · hr) |
|---|---|---|---|
|   | Fe$^{3+}$ Concentration in HCl: 0% | Fe$^{3+}$ Concentration in HCl: 1.8% |   |
| 0.5 | 1.0 | 1.2 | 0.0 |
| 0.0 | 1.2 | 7.5 | 0.5 |

EXAMPLE 1

About 1.7 m$^3$-volume jacket of a 14 m$^3$-volume glass-lined reaction vessel, whose glass lining side steel had a thickness of 12 mm, was subjected to descaling as follows to remove an iron oxide-based scale deposit whose amount was estimated to be about 90 kg.

Laurylamine was dissolved in diethylene glycol, and the solution was then dissolved in hydrochloric acid to prepare 2.8 m$^3$ of a cleaning solution comprising a 10% hydrochloric acid aqueous solution containing 100 ppm of laurylamine (with 900 ppm of diethylene glycol), 200 ppm of propargyl alcohol, and 0.5% of stannous chloride. The cleaning solution kept at 60° C. was circulated in the jacket for 3.5 hours.

While the cleaning solution being circulated, the rate of hydrogen permeation was measured by means of a measuring apparatus (in accordance with the glycerin substitution method) which is fitted to a part of the outer wall of the jacket (thickness: 5 mm). It was found to be 1 ml/m$^2$·hr or less.

Descaling was stopped after 3.5 hours, and the jacket was thoroughly rinsed (inclusive of neutralization with an alkali). After the rinsing, the glass surface was in good condition, and it was proved by visual observation that almost 100% of the scale on the inside wall of the jacket was removed with substantially no corrosion of the matrix.

The total thermal conductivities before and after the descaling were found to be 244 kcal/m$^2$·hr·° C. and 375 kCal/m$^2$·hr·° C., respectively, indicating a 53% improvement.

EXAMPLE 2

About 2.1 m$^3$-volume jacket of a 20 m$^3$-volume glass-lined reaction vessel was subjected to descaling as follows to remove an ion oxide-based scale whose amount was estimated to be about 120 kg.

Laurylamine was dissolved in diethylene glycol, and the solution was dissolved in hydrochloric acid to prepare 3.1 m$^3$ of a cleaning solution comprising a 10% hydrochloric acid aqueous solution containing 100 ppm of laurylamine (with 700 ppm of diethylene glycol), 200 ppm of propargyl alcohol, and 0.8% of stannous chloride. The cleaning solution was kept at 60° C. and circulated in the jacket for 5 hours. During the circulation, the rate of hydrogen permeation through a 1 mm thick test piece made of soft steel fitted to a measuring box provided in the circulation line was measured according to an electrochemical method. The rate of hydrogen permeation was found to be 1 ml/m$^2$·hr or less.

After descaling for 5 hours, the jacket was thoroughly rinsed (inclusive of alkali neutralization). After the rinsing, the glass surface was found to be in good condition, and it was visually observed that almost 100% of the scale had been removed without substantial corrosion of the matrix.

The total thermal conductivities before and after the descaling were found to be 261 kcal/m$^2$·hr·° C. and 340 kcal/m$^2$·hr·° C., respectively, indicating a 30% improvement.

EXAMPLE 3

About 2.1 m$^3$-volume jacket of a 20 m$^3$-volume glass-lined reaction vessel was subjected to descaling as follows to remove an iron oxide-based scale whose amount was estimated to be about 130 kg.

A 3.0 m$^3$ cleaning solution was prepared from a 5% citric acid aqueous solution containing 0.3% of an inhibitor for an organic acid IBIT No. 30AR (a trade name, produced by Asahi Kagaku Kogyo K.K.) and 0.5% of stannous chloride. The cleaning solution kept at 65° C. was circulated through the jacket for 5 hours. The rate of hydrogen permeation during the circulation was measured by an electrochemical method using a 1 mm thick test piece made of soft steel fitted in a measuring box provided in the circulation line and was found to be 1 ml/m$^2$·hr or less.

After descaling for 5 hours, the jacket was rinsed (inclusive of alkali neutralization). After the rinsing, the glass surface was in good condition, and visual observation of the inside of the jacket revealed that a small amount of the scale had been removed without substantial corrosion of the matrix.

The total thermal conductivities before and after the descaling were found to be 270 kcal/m$^2$·hr·° C. and 287 kcal/m$^2$·hr·° C., respectively, indicating a 6.3% improvement.

While the invention has been described in detail and with reference to specific embodiments thereof, it will be apparent to one skilled in the art that various changes and modifications can be made therein without departing from the spirit and scope thereof.

What is claimed is:

1. A method for descaling the inside of a jacket of a glass-lined instrument by circulating an aqueous hydrochloric acid solution containing at least one acid inhibitor selected from the group consisting of laurylamine, lauryldimethylamine and propargyl alcohol, which comprises the steps of:
   (a) measuring a rate of hydrogen permeation through the jacket material or a test piece fitted to the circulation line of the aqueous hydrochloric acid solution;
   (b) inserting the measured value into a previously established relationship between thickness of a steel plate and a rate of hydrogen permeation;
   (c) estimating the rate of hydrogen permeated through the matrix of the instrument to the lining glass side from the relationship; and
   (d) controlling the concentrations of the hydrochloric acid and the acid inhibitor, the descaling temperature or the descaling time so that the amount of hydrogen permeated through the matrix may not exceed 30 ml per m$^2$ of the matrix during the descaling.

2. A method for descaling the inside of a jacket of a glass-lined instrument by circulating an aqueous hydrochloric acid solution containing at least one acid inhibitor selected from the group consisting of laurylamine, lauryldimethylamine and propargyl alcohol, which comprises the steps of:
   (a) measuring a rate of hydrogen permeation through a test piece fitted to the circulation line of the aqueous hydrochloric acid solution;
   (b) inserting the measured value into a previously established relationship between (1) ratio of thickness of test piece to thickness of the matrix of the instrument and (2) rate of hydrogen permeation through the test piece;
   (c) using the result of (b) to estimate the rate and amount of hydrogen permeated through the matrix of the instrument to the lining glass side; and
   (d) controlling the concentrations of the hydrochloric acid and the acid inhibitor, and the descaling temperature and/or the descaling time so that the amount of hydrogen permeated through the matrix does not exceed 30 ml per m² of the matrix during the descaling.

3. A method for descaling the inside of a metal instrument having a glass lining by circulating over the metal surface an aqueous hydrochloric acid solution containing at least one acid inhibitor selected from the group consisting of laurylamine, lauryldimethylamine and propargyl alcohol, which method further comprises the steps of:

(a) determining the thickness of the metal matrix of the metal instrument (T);
(b) determining the thickness of a test piece ($T_0$);
(c) fitting the test piece to the circulation line of the aqueous hydrochloric acid solution;
(d) measuring the rate of hydrogen permeation through the test piece $T_0$;
(e) determining the rate of hydrogen permeation through the metal matrix to the lining glass side in accordance with the following equation:

$$H = H_0 \times \left[ \frac{T_0}{T} \right]^x$$

wherein H is a rate of hydrogen permeation (ml/m²·hr) through the matrix;
T is a thickness (mm) of the matrix;
$H_0$ is a rate of hydrogen permeation (ml/m²·hr) through the test piece;
$T_0$ is a thickness (mm) of the test piece; and
X is a coefficient of from 1 to 2.5 varying depending on the ratio of the thickness of the matrix and the test piece; and (f) controlling the concentrations of the hydrochloric acid and the acid inhibitor, and the descaling temperature and/or the descaling time so that the amount of hydrogen permeated through the matrix does not exceed 30 ml per m² of the matrix during the descaling.

4. A method as claimed in claim 3, wherein said hydrochloric acid aqueous solution further contains stannous chloride.

5. A method as in claim 3, wherein said acid inhibitor is added to said hydrochloric acid aqueous solution in concentrations of from about 50 to 1,000 wt. ppm.

6. A method as in claim 3, wherein said acid inhibitor is added to said hydrochloric acid aqueous solution in concentrations of from about 100 to 500 wt. ppm.

7. A method as in claim 6, wherein said stannous chloride is added to said hydrochloric acid aqueous solution in a concentration of from about 0.1 to 5% by weight.

8. A method as in claim 3, wherein the concentration of said hydrochloric acid is from 5 to 15% by weight.

9. A method as in claim 3, wherein the rate of hydrogen permeation does not exceed 10 ml/m².

10. A method as in claim 3, wherein the rate of hydrogen permeation through the jacket material or a test piece is measured by the glycerin substitution method.

11. A method as in claim 3, wherein said test piece is the jacket material.

* * * * *